DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 21, 1972

896 O.G. 833

T896,043

STABILIZATION OF PHOTOGRAPHIC MULTI-LAYER COLOR PRODUCTS

Harry C. Baden, Webster, N.Y. (1669 Lake Ave., Rochester, N.Y. 14615), and Charleton C. Bard and James S. Bruce, both of 1669 Lake Ave., Rochester, N.Y.

Filed Mar. 1, 1971, Ser. No. 120,057

Int. Cl. G03c *1/76*

U.S. Cl. 96—68

No Drawing. 17 Pages Specification

Multilayer color films of the incorporated coupler type are stabilized so as to maintain their sensitometric properties during storage by hardening the emulsion layers with an aldehydic gelatin hardener such as succinaldehyde bis-bisulfite, neutralizing unreacted hardener with, for example, hydroxylamine sulfate, treating the emulsion layers with bromide salt solution and drying the film.